C. W. PEIFFER.
NUT LOCK.
APPLICATION FILED MAY 13, 1909.
953,545.
Patented Mar. 29, 1910.
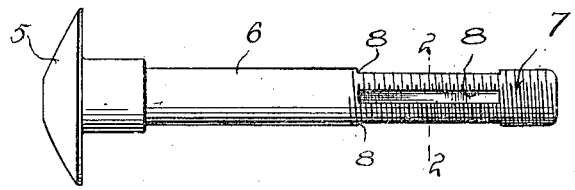
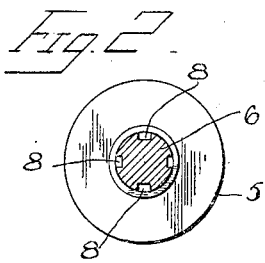
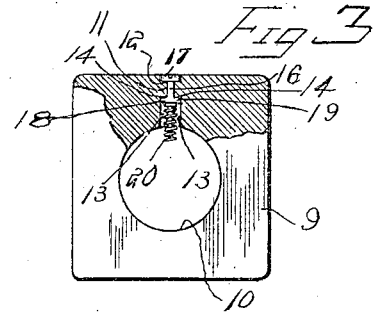
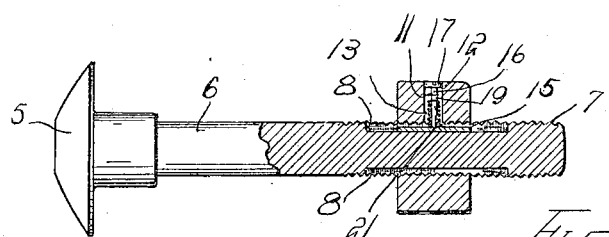
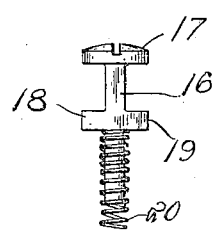
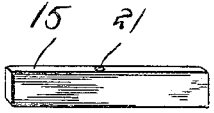
Witnesses
Inventor
Charles W. Peiffer.
By
Attorneys

UNITED STATES PATENT OFFICE.

CHARLES W. PEIFFER, OF LLEWELLYN, PENNSYLVANIA.

NUT-LOCK.

953,545.  Specification of Letters Patent.  Patented Mar. 29, 1910.

Application filed May 13, 1909. Serial No. 495,618.

*To all whom it may concern:*

Be it known that I, CHARLES W. PEIFFER, a citizen of the United States, residing at Llewellyn, in the county of Schuylkill, State of Pennsylvania, have invented certain new and useful Improvements in Nut-Locks; and I do hereby declare the following to be a full, clear, and exact description of the invention, such as will enable others skilled in the art to which it appertains to make and use the same.

This invention relates to improvements in nut-locks, and more particularly to the type wherein the nut will be locked on the bolt, in such a manner that it may be readily disengaged therefrom whenever desired.

One object of the invention is the provision of a bolt, provided with a mutilated thread, the mutilated portions constituting seats, which are adapted to receive a locking block, and a nut to be fitted onto the threaded shank of the bolt and having means to maintain the block in position in the seats or mutilated portions of the bolt.

With these and other objects in view as will more fully hereinafter appear, the present invention consists in certain novel details of construction and arrangement of parts, hereinafter fully described, illustrated in the accompanying drawings and more particularly pointed out in the appended claims.

It is understood that various changes in the form, proportion, size and minor details of the device may be made without departing from the spirit or sacrificing any of the advantages of the invention.

In the accompanying drawings forming part of the specification:—Figure 1 is a side elevation of the bolt. Fig. 2 is a transverse sectional view on the line 2—2, Fig. 1. Fig. 3 is a front elevation of the nut, showing the keeper applied thereto. Fig. 4 is a longitudinal sectional view of the bolt and nut and showing the parts in locked position. Fig. 5 is a detailed side elevation of the keeper. Fig. 6 is a perspective view of the locking block.

Similar numerals of reference are employed to designate corresponding parts throughout.

As shown in the drawings the bolt is provided at one end with the usual head 5, from which extends the shank 6, which is threaded as shown at 7. The thread of the shank extends for the major portion of its length, and extending longitudinally of the thread portion of the shank are a plurality of recesses 8. In the present instance four of these recesses are shown and are arranged equal distances apart on the threaded portion of the bolt. The recesses extend from a point adjacent the inner end of the threaded portion 7 of the shank to a point adjacent the outer end of the shank, as clearly shown in Fig. 1. With this construction it is obvious that a bolt is provided wherein a mutilated thread is produced, the recesses 8 constituting what will subsequently be termed seats.

The nut in the present instance is designated in general by the numeral 9, and is shown to be of the square type. It is to be understood, however, that I am not to be limited to this specific form of nut, since from what will appear later it will be obvious that most forms of nuts now employed with bolts, may be used. The nut is provided with the usual aperture 10, which is threaded to receive the threaded shank of the bolt and extending from one of the outer faces of the nut and terminating in the threaded opening 10, is a transversely disposed and rectangular shaped recess 11. The outer end of the recess is enlarged laterally as shown at 12, so as to provide an annular seat for the head of the keeper to be presently described. The inner end portion of the recess is widened laterally as shown at 13, so as to provide shoulders 14, which are disposed intermediate of the edge of the opening 10 and face of the nut.

The locking block in the present instance is designated by the numeral 15 and is substantially rectangular in facial contour and cross section and is of a size to nicely fit within the seats 8.

A keeper is shown at 16 and comprises a set screw structure, corresponding in length to the distance between the edge of the opening 10 of the nut and outer face of the latter. This keeper is designed to maintain the locking block in position and is provided at one end with a head 17, which is adapted to be seated in the enlarged portion 12 of the outer face of the nut and outer end of the recess 11, so as to be substantially flush with the outer face of the nut. The keeper is intermediately provided with a pair of oppositely extending lateral arms 18 and 19 the outer ends of which lie in a plane with the edge of the head 17. The distance between the ends of the arms corresponds approximately to the width of the recess, so that the keeper may be readily inserted therein and when turned the arms will engage the shoulders 14 formed by the enlargement 13 and narrow portion of the recess. A coil or helical spring 20 is shown encircling that portion of the keeper between the arms 18 and 19 and the end remote from the head 17.

In the use of the device the nut is threaded on to the threaded shank 7, in the usual manner until its lateral opening is disposed over one of the seats 8, and its inner face bears on the object to be clamped. The locking block 15 is then inserted into the opening presented by the inner threaded wall of the nut and one of the seats 8, the keeper is then inserted into the recess until its inner end bears on the intermediate portion of the block 15, which is provided with a slight depression 21 to receive the said inner end of the keeper, and the lateral arms 18 and 19 are turned to bear on the shoulders 14. The spring 20 which is of greater length than the shank of the keeper which it encircles will now have its opposite terminals bearing on the arms 18 and 19 and face of the locking block, whereby the latter will be held in position by the seat and prevented from falling out. In this position, it is obvious that it will be impossible to turn the nut 9, owing to the inability of the locking block to turn over the threaded portion of the bolt. When it is desired to disengage the parts, the keeper is simply turned until the arms 18 and 19 are turned from engagement with the shoulders 14, this will permit the keeper to move outward due to the action of the spring 20, whereby the locking block can be taken from its seat.

Having thus described my invention what is claimed as new, is:—

1. The combination with a bolt having oppositely arranged and longitudinally disposed seats, a nut to fit the thread of said bolt and provided with a transverse recess, a block insertible into the spaces formed by said seats and the threaded wall of the nut, a keeper removably secured in the recess of the nut and provided with lateral arms, and a spring encircling the keeper and coöperating with the lateral arms to hold the block within the seat.

2. The combination of a bolt having oppositely arranged and longitudinally disposed seats, a nut to fit the threaded end of said bolt, and having a transverse recess interiorly provided with lateral shoulders, a block insertible into the space formed by said seats, and the threaded wall of the nut and a keeper insertible into the recess of the nut and having lateral arms to engage the shoulders thereof, and a spring encircling the keeper and adapted to bear on the face of said block.

In testimony whereof, I affix my signature, in presence of two witnesses.

CHAS. W. PEIFFER.

Witnesses:
 LEVI G. ADAMS,
 CHARLES HOLMES.